US009500318B2

(12) United States Patent
Gillia et al.

(10) Patent No.: US 9,500,318 B2
(45) Date of Patent: Nov. 22, 2016

(54) TANK FOR THE STORAGE OF HYDROGEN IN THE FORM OF METALLIC HYDRIES

(71) Applicants: AGCO SA, Beauvais (FR);
Commissariat À L'Energie Atomique Et Aux Energies Alternatives, Hesston, KS (US)

(72) Inventors: Olivier Gillia, Sassenage (FR);
Frederic Ducroquet, Orville (FR);
Gabriel Menier, Beauvais (FR);
Geoffroy Husson, Ottersthal (FR);
Jean-Philippe Poirot-Crouvezier, Paris (FR); Albin Chaise, Paris (FR)

(73) Assignees: AGCO, SA, Beauvais (FR);
COMMISSARIAT À L'ÉNERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/365,834

(22) PCT Filed: Dec. 10, 2012

(86) PCT No.: PCT/EP2012/074945
§ 371 (c)(1),
(2) Date: Jun. 16, 2014

(87) PCT Pub. No.: WO2013/087565
PCT Pub. Date: Jun. 20, 2013

(65) Prior Publication Data
US 2015/0008145 A1  Jan. 8, 2015

(30) Foreign Application Priority Data
Dec. 15, 2011  (FR) ...................................... 11 61707

(51) Int. Cl.
*F17C 11/00* (2006.01)
*C01B 3/00* (2006.01)
*B23P 19/00* (2006.01)

(52) U.S. Cl.
CPC .............. *F17C 11/005* (2013.01); *B23P 19/00* (2013.01); *C01B 3/001* (2013.01); *C01B 3/0026* (2013.01); *C01B 3/0031* (2013.01); *C01B 3/0036* (2013.01); *C01B 3/0042* (2013.01); *Y02E*

(Continued)

(58) Field of Classification Search
CPC ..... B23P 19/00; C01B 3/001; C01B 3/0026; C01B 3/0031; C01B 3/0036; C01B 3/0042; F17C 11/005; Y02E 60/321; Y02E 60/327; Y02E 60/36; Y10T 29/49826; B01D 53/04
USPC .................. 96/108, 126; 206/0.7; 423/658.2; 429/515; 29/428
See application file for complete search history.

(56) References Cited

U.S. PATENT DOCUMENTS

| 4,446,111 A * | 5/1984 | Halene .................. C01B 3/0005 206/0.7 |
| 5,019,358 A * | 5/1991 | Suzuki ................. B01J 19/2425 422/312 |

(Continued)

FOREIGN PATENT DOCUMENTS

| DE | 202008004236 U1 | 6/2008 |
| EP | 1803992 A1 | 7/2007 |

(Continued)

OTHER PUBLICATIONS

International Searching Authority, International Search Report and Written Opinion for PCT Application PCT/EP2012/074945, mailed Jun. 11, 2013.

*Primary Examiner* — Frank Lawrence

(57) ABSTRACT

A tank intended for the storage of hydrogen by absorption into material, including a first part and a second part, each of the first and second parts including a barrel, closed at one first longitudinal end by a substantially hemispherical part, the two parts being joined by the second open longitudinal end of the barrel by an assembly plate, the above-mentioned tank including two heat exchangers, each being contained in one of the two parts and intended to be under the same hydrogen pressure, the above mentioned tank also having apparatus of supply and evacuation of heat transfer medium circulating in the above mentioned heat exchangers integrated in the assembly plate, and apparatus of supply and collection of hydrogen.

20 Claims, 4 Drawing Sheets

(52) U.S. Cl.
 CPC .... 60/321 (2013.01); *Y02E 60/327* (2013.01); *Y02E 60/36* (2013.01); *Y10T 29/49826* (2015.01)

(56) References Cited

U.S. PATENT DOCUMENTS

| | | | |
|---|---|---|---|
| 7,922,789 B1* | 4/2011 | Deane | B01D 53/0407 128/204.17 |
| 2003/0209149 A1* | 11/2003 | Myasnikov | C01B 3/0005 96/146 |
| 2005/0000970 A1* | 1/2005 | Kimbara | C01B 3/0005 220/581 |
| 2005/0103196 A1* | 5/2005 | Wu | C01B 3/0005 96/134 |
| 2010/0219087 A1* | 9/2010 | Fujita | F17C 11/005 206/0.7 |

FOREIGN PATENT DOCUMENTS

| | | |
|---|---|---|
| JP | 1145500 A | 6/1989 |
| WO | WO 2006/135945 A1 | 12/2006 |

* cited by examiner

TANK FOR THE STORAGE OF HYDROGEN IN THE FORM OF METALLIC HYDRIES

TECHNICAL FIELD

The present invention concerns a tank for the storage of hydrogen in the form of metallic hydrides.

BACKGROUND

Due, in particular, to a reduction in reserves of petroleum, energies which are alternatives to petroleum are being sought. One of the promising directions for these sources of energy is hydrogen, which can be used in fuel cells to produce electricity.

Hydrogen is an element which is very widespread in the universe and on earth, it can be produced from coal, natural gas or other hydrocarbons but also by simple electrolysis of water by using, for example, electricity produced by solar or wind energy.

Hydrogen cells are already used in certain applications, for example in automobiles, but are not yet very widespread, in particular due to the precautions which have to be taken and the difficulties of storing hydrogen.

Hydrogen may be stored in the form of compressed hydrogen between 350 and 700 bars, which raises safety problems. So, tanks capable of withstanding these pressures must be provided, knowing, moreover, that when these tanks are installed in vehicles they may be subject to impacts.

Hydrogen can be stored in liquid form, but such storage only ensures a low storage yield and does not allow long-term storage. The passage of a volume of hydrogen from liquid state to gaseous state in normal conditions of pressure and temperature produces an increase in its volume by a factor of about 800. Tanks for hydrogen in liquid form are not, in general, very resistant to mechanical impacts, which raises serious safety problems.

There also exists storage of what is called "solid" hydrogen in the form of hydride. Such storage allows a considerable volumetric density of storage and makes use of moderate hydrogen pressure while minimizing the energy impact of storage on the overall yield of the hydrogen chain, i.e. from its production to its conversion into a different energy.

The principle of solid storage of hydrogen in the form of hydride is the following: certain materials and, in particular, certain metals possess the capacity of absorbing hydrogen to form a hydride—this reaction is called absorption. The hydride formed may again give hydrogen gas and a metal. This reaction is called desorption. Absorption or desorption take place depending on the partial pressure of hydrogen and on temperature.

Absorption and desorption of hydrogen on a metallic powder or matrix M take place according to the following reaction:

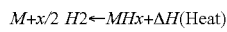

$$M + x/2\ H_2 \leftrightarrows MH_x + \Delta H \text{(Heat)}$$

M being the metallic powder or matrix.

MHx being the metallic hydride.

For example, a metallic powder is used which is put in contact with hydrogen, a phenomenon of absorption appears and a metallic hydride is formed. Release of the hydrogen takes place according to a mechanism of desorption.

The storage of hydrogen is an exothermic reaction, i.e. one which releases heat, while the release of hydrogen is an endothermic reaction, i.e. one which absorbs heat.

In particular, rapid charging of the metallic powder with hydrogen is sought. To obtain such rapid charging, the heat produced during this charging must be evacuated to avoid delaying the absorption of hydrogen on the metal powder or matrix. When hydrogen is released, heat is taken in.

The tank is therefore equipped with a heat exchanger including a circuit in which a heat transfer medium circulates, and this circuit is connected to a circuit on the outside of the tank and means of introducing hydrogen into the tank for its absorption and means of collection of hydrogen in the desorption phase.

A phase of absorption followed by a phase of desorption of hydrogen is called a "hydration cycle".

The tank must also be able to withstand the pressure of hydrogen. In present applications, an interesting pressure interval is situated within the 1-30 bar absolute Interval, knowing that, depending on the type of hydride used, this interval is likely to become wider or narrower. "Hybridisation" of this type of storage using hydrides with storage of hydrogen under pressure can also be considered. Currently, the pressure interval is from 1 to 300 bars or even 1-700 bars.

This requirement is even more difficult to fulfill easily, as reduction in the mass of tanks is being sought, in particular for tanks installed in vehicles.

Document US-2005/0188847 describes a tank for hydrogen stored in the form of hydride including a shell composed of a central tubular part and two longitudinal hemispherical ends. One of the hemispherical ends and the tubular part are made in one piece from stainless steel and the second hemispherical end, also made of stainless steel, is attached by screwing after the installation of the heat exchanger. The shell is then coated with a composition made of carbon fibre to increase the tank's ability to withstand hydrogen pressure. The hydride is stored in the shell inside spaces bordered by the blades of the heat exchanger.

The introduction of the heat exchanger is complicated, as is the making of the shell, which must be done in two stages.

Document W0-2007/011476, describes a hydrogen tank comprised of a shell which is also composed of a central tubular part and two longitudinal hemispherical ends, the whole of which is made of steel. Each of the ends has an opening, one to allow hydrogen supply and hydrogen collection, and the other the circulation of the heat transfer medium. This tank is not easy to dismantle, which makes any work inside the tank difficult. In addition, if the shell is made by welding, as hydride is very sensitive to air, this operation must be performed using a glove box, which makes its fabrication complicated.

SUMMARY OF THE INVENTION

Consequently, the aim of the present invention is to offer a hydrogen storage tank with reduced mass and relatively simple construction as compared with state of the art tanks.

The above-mentioned aim is achieved by a tank with a shell to contain the hydrides and to withstand hydrogen pressure, with the shell consisting of two parts, each closed at one of its ends and open at the other and connected by their open ends to an assembly plate, and heat exchangers in which a heat transfer agent circulates; the heat exchangers are fed through the assembly plate.

In other words, two half-tanks are made linked by a central plate which ensures supply to the heat exchangers inside the tank. The whole which is thus formed is hermetic. This tank is easy to fabricate and the heat exchanger and the hydride are easy to position inside the shell.

In addition, the two half-tanks are at equal hydrogen pressure so the assembly plate is subject to the same pressure on both is surfaces, and is therefore not subject to bending stress. This therefore allows freedom of construction and it need not be very thick. This also makes it possible to reduce the mass of the tank.

Very advantageously, the two half-tanks have substantially hemispherical bottoms. In the present application, "substantially hemispherical" means a form in the range between a hemisphere, i.e. a half-sphere of constant radius and a hemisphere with a flattened bottom. An item with such a form is also called a "convex bottom".

If the tank has substantially hemispherical ends, this gives it good resistance to pressure and reduced mass due to the fact that its forms holding the hydrogen pressure are free from flat surfaces.

In accordance with one aspect of the invention there is provided a tank intended for the storage of hydrogen by absorption in a material, which has a longitudinal axis; the tank having a first part and a second part, each of the first and the second parts includes a shell with a closed first longitudinal end and an open second longitudinal end and an assembly plate; the first part and the second part are joined on the level of the second open longitudinal ends of the shells by the assembly plate; the inner volumes of the two parts are intended to be at the same pressure; this tank also includes two heat exchangers, each enclosed in one of the above-mentioned parts, and spaces for the hydrogen storage material; the above-mentioned tank also has means of connection to means of supply and evacuation of a heat transfer medium circulating in the above-mentioned heat exchangers integrated into the assembly plate and means of supply and collection of hydrogen.

In one advantageous embodiment, each of the shells includes a barrel and a substantially hemispherical bottom forming the dosed first longitudinal end.

The heat exchangers include, for example, tubes in which the fluid circulates in the two parts of the tank.

In one embodiment, the assembly plate has at least one cavity for the distribution of heat transfer medium, into which the first tubes of the heat exchanger open and at least one evacuation cavity into which the second tubes of the heat exchanger open; each first pipe is connected to at least one second pipe on the level of the hemispherical part.

It is preferable for the assembly plate to be composed of two half-plates which define between them the distribution and evacuation cavities. The tank may have braces directed longitudinally between the two half-plates. These braces advantageously are substantially shaped like a bobbin.

The assembly plate may have at least one radial aperture opening into the distribution cavity and at least one radial aperture opening into the evacuation cavity; these apertures are intended to be connected to the means of supply and evacuation of heat transfer medium.

Advantageously, the first tubes of the two heat exchangers may open into the same distribution cavity and the second tubes of the two heat exchangers open into the same evacuation cavity.

In one embodiment, the tank has connection chambers situated on the level of each of the first closed longitudinal ends of the shells, into which the first and second tubes open. Preferably, braces are arranged in at least one of the connection chambers, these braces are directed longitudinally and these braces have a notable bobbin shape.

In another embodiment, each first tube and each second tube of each heat exchanger are formed as a U-tube, with the bottom of the U situated on the level of the first dosed longitudinal ends of the shells.

The means of supply and collection of hydrogen may contain at least one connection tube passing through a wall of the barrel or the assembly plate of the first part and at least one connection pipe passing through the barrel of the second part or the assembly plate.

It is preferable for the hydrogen connection tubes to form a "crow's foot" type of connection, directly interconnecting the hydrogen pressure chambers of Parts I and II.

Each of the parts may contain a connecting flange by which it is fixed to the assembly plate by screw and nut sets or by welding.

Advantageously, the spaces for the hydrogen storage material may be formed by the heat exchangers.

A second aspect of the present invention also has as its object a tank for the storage of hydrogen by absorption including a tank according to the present invention and hydrogen storage material.

In accordance with a third aspect of the present invention there is provided a process for the fabrication of a tank according to the first aspect of the present invention, including the steps of:
  making the shells of the first and second parts;
  fixing each heat exchanger loaded with the hydrogen storage material to the assembly plate by the ends of the heat transfer agent tubes;
  installing the heat exchangers in the shells forming the first and second parts;
  assembling the shells on the assembly plate;

When the assembly plate is composed of two half-plates, the tubes of each heat exchanger may then be fixed to a half-plate of the assembly plate, the two half-plates being assembled when the shells are assembled.

For example, the shells include a barrel closed by a substantially hemispherical bottom, these barrels are equipped with flanges at their open end, the assembly of the first and second parts may be performed by screw and nut sets going through the flange and the two assembly half-plates or by welding.

BRIEF DESCRIPTION OF THE DRAWINGS

The present Invention will be better understood with the help of the following description and the attached drawings, in which.

DETAILED DESCRIPTION OF SPECIFIC MANUFACTURING METHODS

Figure 1:
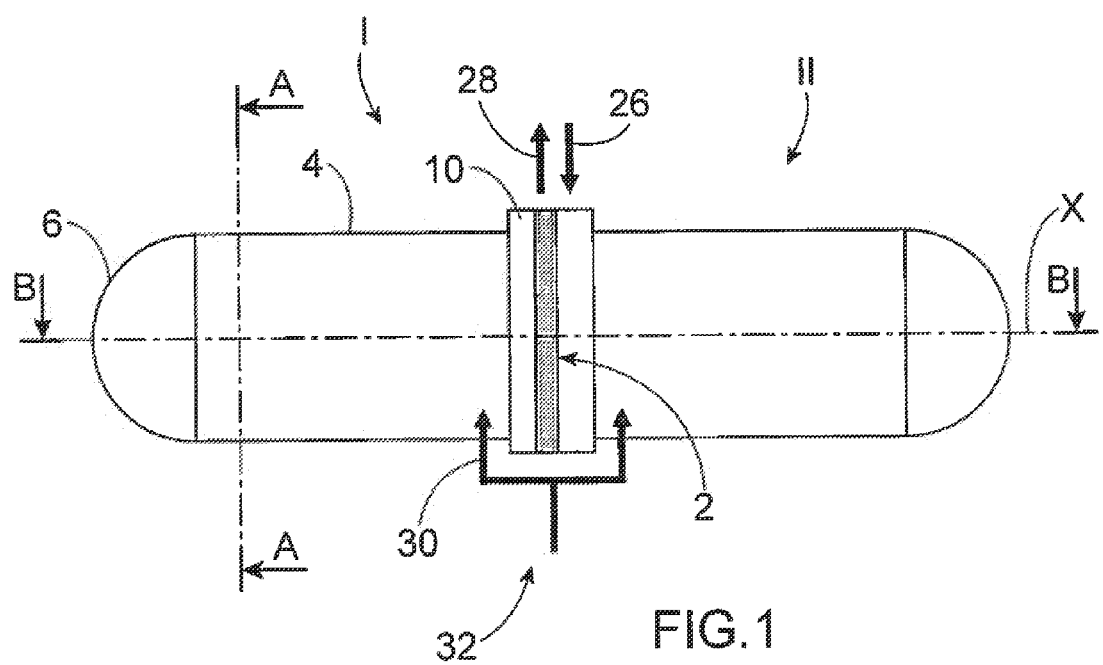
FIG. 1 is a side view of an embodiment of a hydrogen tank according to the present invention.

In FIG. 1, an exterior view of an embodiment of a reservoir according to the present invention can be seen, it extends along a longitudinal axis X and contains hydrogen storage material.

The tank includes a first part I and a second part II joined on an assembly plate (2). Each part I, II forms a sub-assembly. As the two assemblies I, II are similar, we shall describe only sub-assembly I in detail.

Sub-assemblies I, II, with assembly plate (2), form a tank.

In the example illustrated, very advantageously, sub-assembly I includes a shell (3) with longitudinal axis X farmed by a barrel (4) and a substantially hemispherical part (6) hermetically closing the first longitudinal end 4.1 of the barrel (4). This shape provides very good performance under pressure.

In the embodiment shown, the barrel (4) has a circular section. The second longitudinal end 4.2 of the barrel is open and equipped with means of fixation (8) of the shell (3) to the assembly plate (2).

In the embodiment shown, the means of fixation (8) include a flange (10) fixed on the second longitudinal end of the barrel (4) and intended to be joined to the assembly plate (2) by means of screw and nut sets (not shown). For this purpose, the flanges (10) and the assembly plate (2) are made with drilled apertures. This example of fixation is not in any case restrictive. Any other type of fixation, preferably one which can be opened, is within the scope of the present invention, including any solution making it possible to ensure that the joint between the barrels (15) and the assembly plate is hermetic, such as, for example, the use of an 0-ring seal positioned in a machined neck in the flanges (10) or in the plate (2). Assembly by welding can also be envisaged; such assembly makes it possible to have smaller flanges (10) and to eliminate screw and nut joints which are usually of large size. The mass of the tank is thus reduced.

Figure 2:
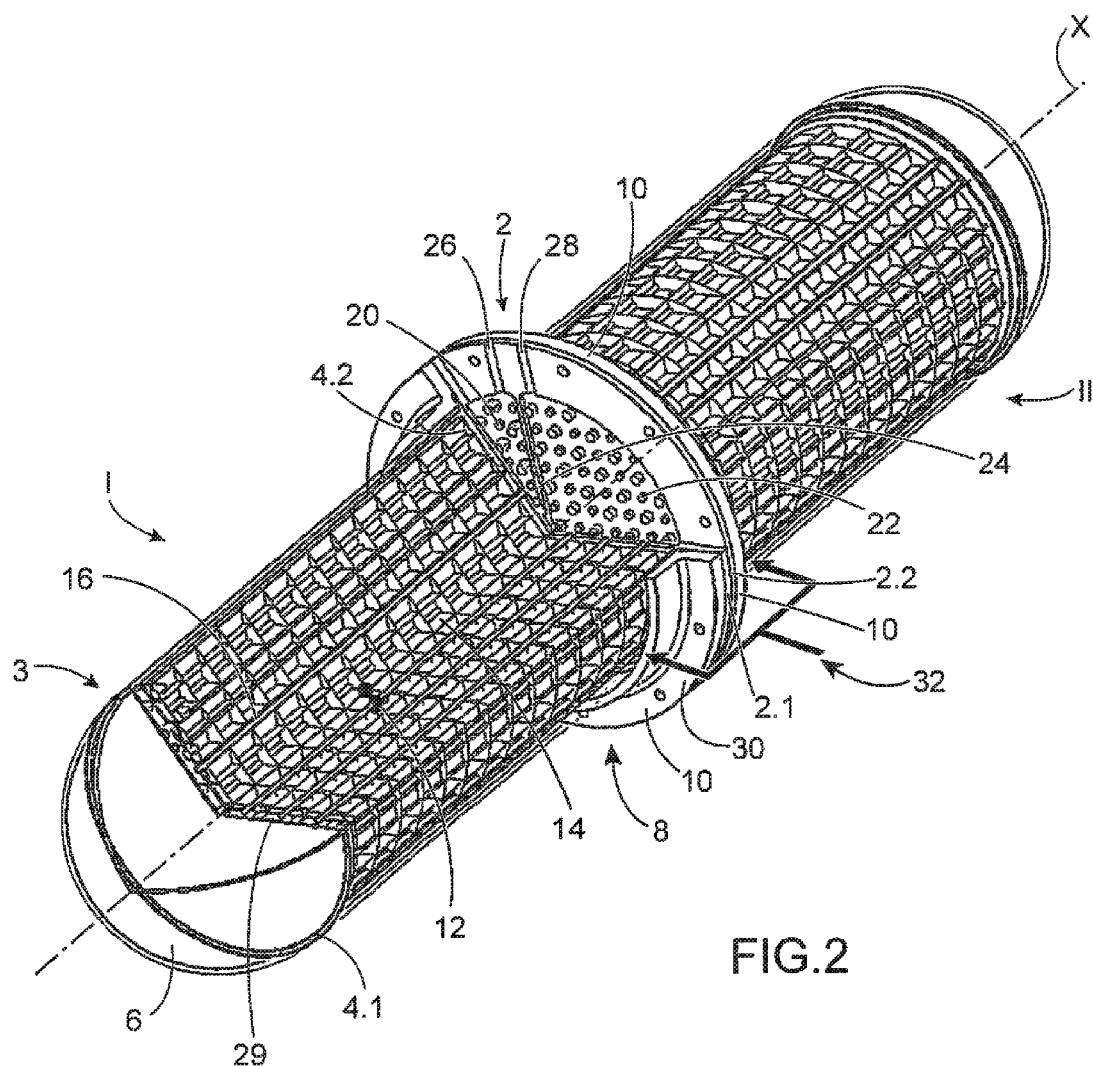
FIG. 2 is a partially cut away view in perspective of the tank of FIG. 1 according to a first embodiment.

In FIG. 2, a partially cut-away view of a first embodiment of the tank in FIG. 1 can be seen, more particularly of sub-assembly I. The interior of sub-assembly II is represented in transparent form. Sub-assembly includes a heat exchanger (12) forming spaces in which the hydride material is placed. This exchanger (12) is intended for extraction of heat during absorption of hydrogen by the hydrogen storage material and for giving the heat necessary for desorption of hydrogen.

The heat exchanger (12) consists of a plurality of blades (14) which, among themselves, separate the compartments for the storage of the hydrogen to be heated or cooled. The heat exchanger also has a heat transfer agent circulation circuit inside the structure formed by the blades for the extraction or introduction of heat. This circulation circuit is intended to be connected to a circuit on the outside of the tank. The circulation circuit also ensures circulation of heat transfer agent through the tank making it possible to extract or introduce heat in a homogenous way.

Figure 3:
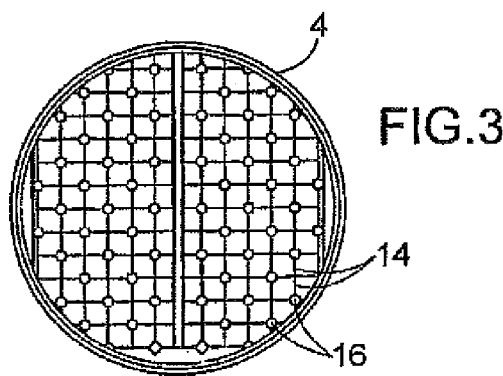
FIG. 3 is a cross-section view along the plane A-A of the tank according to the second embodiment.

The longitudinal axis X of the tank is intended to be directed horizontally. In the embodiment shown, the horizontal blades separate a number of levels and each level is divided into compartments by vertical blades extending in parallel to the longitudinal axis X and transversely in relation to the longitudinal axis X. The heat transfer medium circulation circuit contains tubes (16) extending longitudinally and situated in the longitudinal channels formed at the intersection of the horizontal and vertical blades. In FIG. 3 a transverse section of the blades forming the compartments and of the tubes (16) can be seen.

This structure advantageously makes it possible to compartmentalize the hydrogen storage material by ensuring distribution and confinement of the material throughout the whole tank.

The connection of the interior circulation circuit of the heat exchanger with the exterior circuit is made through the assembly plate (2). The circulation circuit is then such that the heat transfer fluid circulates from the second longitudinal end 4.2 of the barrel (4) to the first longitudinal end of the barrel, then returns to the second longitudinal end 4.1 to be evacuated.

In the embodiment in FIG. 2, the assembly plate (2) has two cavities (20, 22) hermetically separated by a partition (24); these cavities are called "water boxes". One of the cavities (20, 22) is the distribution cavity and the other cavity (22, 20) is the collection and evacuation cavity. In addition, the assembly plate (2) also has a radial drilled aperture (26) opening into the distribution cavity and allows supply of heat transfer agent and a radial drilled aperture (28) opening into the evacuation cavity and allowing evacuation of heat transfer agent.

Considering that the heat exchanger has 2 tubes, tubes (16) opening into each cavity (20) and (22). Indeed, the heat transfer agent circulates in 2 supply tubes (16) of the second longitudinal end 4.2 of the barrel to the first longitudinal end 4.1 of the barrel (4) and the heat transfer agent circulates in the return tubes of the first longitudinal end 4.1 of the barrel (4) towards the second longitudinal end 4.2 of the barrel (4).

The tubes (16) may be fixed to the assembly plate by various methods which provide the mechanical hold of the tubes (16) on the assembly plate (2) and hermetic separation between the heat transfer agent circuit and the hydrogen environment. For example, a mechanical method such as beading is used. Joints, for example O-ring seals, may be provided between each tube and the plate. As a variant, the tubes may be directly welded or brazed to the assembly plate.

The assembly plate (2) of made of two half-plates 2.1 and 2.2, making it possible to ensure the fixation and hermetic state of tubes (16) in plate (2). Indeed, it is preferable for tubes (16) to be fixed to each half-plate 2.1 and 2.2 before they are assembled. For example these two half-plates 2.1 and 2.2 are assembled to each other when tightening the assembly by screwing. For example, the hermetic joint between the two half plates 2.1 and 2.2 is ensured by an O-ring seal. This type of assembly provides a tank which can be dismantled. Alternatively, the two half-plates 2.1 and 2.2 can be joined by welding. Each of the half-plates has two recesses separated by a partition. When the two half-plates are assembled, the partitions and the recesses of each part are aligned, thus forming the cavities (20, 22) separated by the partition (24).

Figure 4:
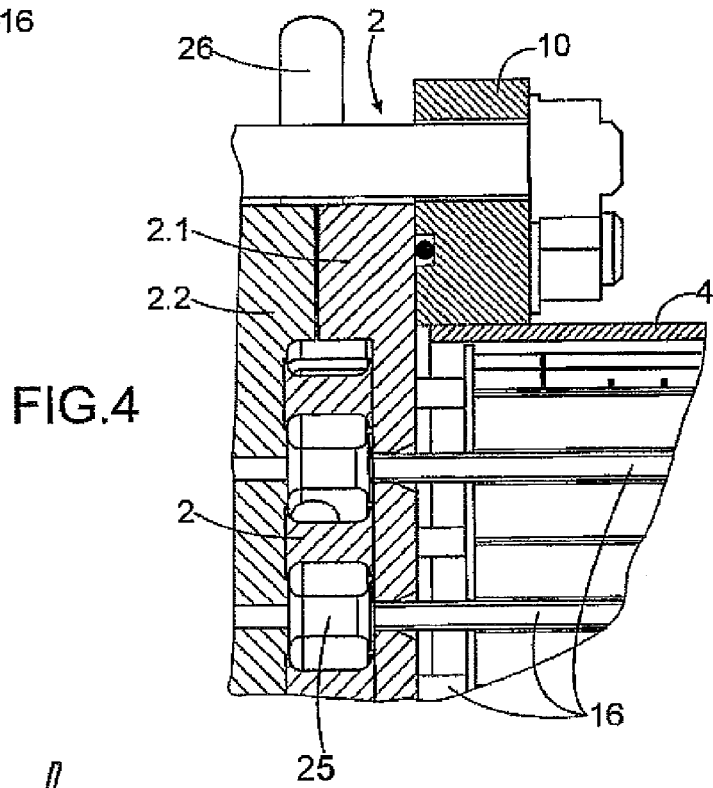
FIG. 4 is a detailed view of a variant of making of the tank in FIG. 2.
Figure 5:
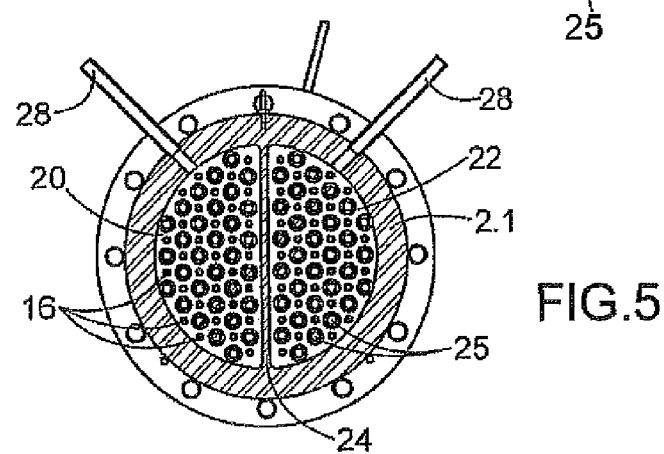
FIG. 5 is a cross-section view of the tank according to the variant in FIG. 4 on the level of the assembly plate.

Very advantageously, as represented in FIG. 4 which is a detailed view of a variant of making of the tank in FIG. 2, braces (25) are positioned between 2.1 and 2.1 parallel to the longitudinal axis in order to prevent collapse of cavities (20, 22) under the pressure of hydrogen gas. Very advantageously, the braces (25) have a bobbin shape, i.e. they have two longitudinal ends of greater diameter and a central part of smaller diameter, while the profile of connection between each end and the central part is smooth. This form has the advantage of distributing the pressure of contact of the pin on the walls of cavities (20, 22), preventing the effect of indentation by pins on the walls.

Figure 6:
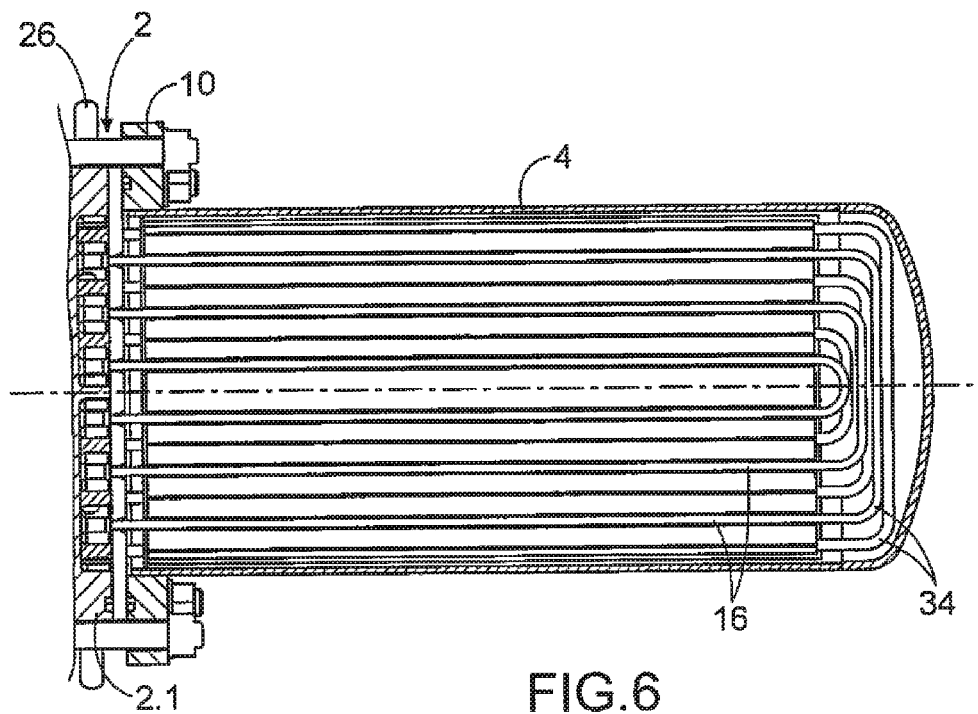
FIG. 6 is a longitudinal cross-section view along the plane B-B of the tank in FIG. 1 according to a second embodiment.

In addition, the central part of lesser diameter gives wider passage to the heat transfer fluid in cavities (20, 22), preventing losses of the load of fluid and thus allowing more homogenous pressure of fluid in the cavities, as homogenous pressure guarantees homogenous distribution of fluid in the various tubes of the exchanger. In FIG. 6, which is a cross-section at the level of the cavities (20) and (22) of the tank according to the variant in FIG. 4, a frontal view of half-plate 2.1 with the ends of the tubes (16) going through it and the braces (25) can be seen.

In the example shown, advantageously, on the level of the first longitudinal end, tubes (16) also open into a water box (29) to allow the flow of heat transfer agent in the supply tubes into the return tubes.

For example, this water box (29) does not have partitions.

The implementation of the water box (29) allows a further reduction in the mass of the tank as it connects all the supply tubes to all the return tubes at the same time. It is preferable for the water box (29) to be joined to the heat exchanger, with the connection between the tubes and the water box then being made outside the shell. Therefore, assembly is simplified. The operation of assembly of the heat transfer agent tubes and the water box (29) outside the shell (3) makes it possible to perform assembly on the walls of the water box (29), ensuring that it is hermetic, either by mechanical assembly, for example by beading, or by welding or brazing, or by a hermetic joint.

This second embodiment has the advantage of not needing means of ensuring seals between the supply tubes and the return tubes.

For example, the water boxes (29) are made from two plates of sheet metal and a peripheral wall. So that the water boxes do not collapse under the pressure of hydrogen, braces are arranged regularly between the plates. These braces may also advantageously be made in the shape of a bobbin and have the same advantages as those described in relation to the cavities (20, 22). As a variant, it can be envisaged that the blades directly from conduits for the heat transfer agent between them, and then connectors are mounted on the assembly plate and, for example, are forced into the conduits. An operation of welding or brazing, for example, makes it possible to ensure the seal between the blades and the assembly plate.

Each sub-assembly I, II is also to be connected to means of supply and collection of hydrogen when this is required, for example for supply to a hydrogen cell. In the embodiment shown, the connection to the means of supply and collection of hydrogen is made by a connection tube (30) tightly going through the wall of the barrel (4) near the flange (10). The connection tube (30) and the connection tube of sub-assembly II are advantageously formed by a single "crow foot" connection (32) which distributes the flow of fluid into two separate flows at the same pressure. The two sub-assemblies I, II are therefore supplied at the same time by the same conduit. This connection (32) makes it possible to obtain the same pressure in both sub-assemblies in a simple way. In addition, bulk is reduced. As a variant, the connection of the means of supply of the tank may be made through the flange (10). Connection either near the flange or through the flange has the advantage that hydrogen and heat transfer fluid supplies are close.

As a variant, the connection of means of hydrogen supply may be envisaged in the convex bottom (6).

The compartments are not sealed to hydrogen; when hydrogen is injected into the shell it circulates between the blades, in particular between the horizontal blades, and is absorbed by the material in all the compartments.

For collection, the hydrogen desorbed in all the compartments is collected by the connection (30).

It is preferable for a single connection to be used for hydrogen collection and supply in order to reduce the number of connections; however a tank in which collection and supply take place through two separate connections is not outside the field of the present invention.

Figure 7:
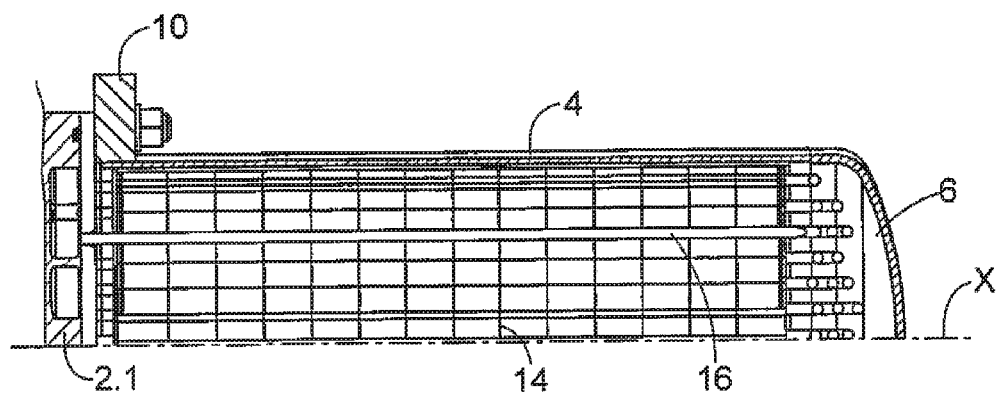
FIG. 7 is a cross-section of the upper part of the tank according to the second embodiment along a plane orthogonal to the plane B-B.

In a second embodiment shown in FIGS. 6 and 7, which differs from the first embodiment on the level of the design of the heat exchange circuit, the other characteristics of the structure are similar or identical. In the tank represented in FIGS. 6 and 7, the supply tube is made in one piece with a return tube by a bend (34) of the tube on the level of the bottom of the barrel, so the tube is at the same time for supply and return, and the water box (29) is therefore eliminated. This embodiment has the advantage of making it simpler to create the seal between the supply tubes and the return tubes.

We shall now describe an example of the process of making the tank in FIG. 2.

The compartments are filled either with blocks of calibrated material which will subsequently be reduced to powder during the first absorption of hydrogen or directly with hydrite already reduced to the state of powder which may, or may not, have already gone through absorption/desorption cycles.

The exchanger is, for example, assembled stage by stage, either by filling the compartments with hydride one by one or by filing several compartments at the same time. A robotic filling device may be used with advantage.

When the compartments of a level have been filled, a level with empty compartments is placed on the level which has been filled and a new phase of filling takes place. Filling is completed when all the levels are superimposed. In FIG. 7 the superimposition of the levels in the upper part of sub-assembly can be seen.

Assembly of the tank without filling the compartments can be envisaged, with them being filled subsequently, for example in another fabrication unit. In this case, to make it possible to assemble the levels one by one after the filling of the compartments, the tubes are not welded to the water boxes (29).

In the next step, each heat exchanger is assembled with its water box. The tubes (16) of the heat exchanger of sub-assembly I are then fixed in the half-plate 2.1 and the tubes (16) of the heat exchanger of sub-assembly II are fixed in half-plate 2.2 by welding or expansion rolling. Then each heat exchanger is mounted in a shell (3). Thus the two sub-assemblies I, II are made. They are then assembled by placing the two half-plates 2.1, 2.2 in contact using screw and nut sets going through the two flanges (10) and the assembly half-plates 2.1, 2.2. A sealing joint may be provided between the two half-plates 2.1, 2.2 and between the flanges (10) and the half-plates 2.1, 2.2. In the embodiment shown, the distribution cavity (22) is common to the two sub-assemblies I, II, as is the evacuation cavity (20).

In FIG. 2, the ends of the tubes of sub-assembly II opening into the cavities (20, 22) can be seen. This simplified version makes it possible to make the assembly plate thinner, reducing the mass of the tank even more. However, a tank in which the assembly plate has cavities dedicated to one of the sub-assemblies I, II or a common distribution cavity and two collection cavities, or vice versa, is not outside the scope of the present invention.

In the embodiment shown, the two sub-assemblies have the same longitudinal dimension. However, they can be made with different longitudinal dimensions, for example to facilitate integration. In this case, hydrogen supply is always ensured in an even way, given that the connection (32) allows instantaneous balancing of hydrogen pressure between the two sub-assemblies.

In the embodiment shown, the connections of the reservoir to exterior systems are grouped together at the level of the assembly plate, which can be very advantageous. However, connections on the level of the ends of the tank can be envisaged.

The barrel (4), the hemispherical end (6) and the flange (10) may be made in one piece, or in several parts assembled, for example, by welding or cold flanging. These three parts may be made from the same material or different materials.

The step of welding is no longer a problem as the hydrogen storage is not yet in place and it can be performed in the open air.

The shell holding pressure can be made of metal material such as steel P355NL2, or stainless steel such as 316L, or any other metal material recognized by regulations as capable of withstanding hydrogen pressure. Alternatively, the shell may be composed of several parts, such as an inner shell with the function of ensuring hydrogen-tightness, also called a liner, and an outer shell intended to withstand the mechanical stress due to the pressure of the hydrogen contained. The outer shell may, for example, be made by the filament winding of glass, carbon or Kevlar® fibers bound by polymer resin. The inner shell may be made of metal, for example aluminum or stainless steel, then the shell is called a "Type III Shell" or of polymer material, then the shell is called a "Type IV Shell". In the first case, the shell is called a "Type III Shell", and in the second case a "Type IV Shell".

The tank is particularly simple to manufacture as the shells are made on their own and then the heat exchangers loaded with hydrogen storage material are introduced, for example in the form of a block, into the shells thus forming the two sub-assemblies I and II which are then brought to the assembly plate. In addition, the connections are simplified.

The use of the assembly plate to make the connection between the heat exchangers and the exterior circuit simplifies the making of the tank, in particular making it sealed. In addition, by supplying the two heat exchangers from the same water boxes situated in the assembly plate, the number of parts needed is reduced, which reduces the mass of the tank.

For example, the hydrogen storage materials may be composed on a base of Mg, Mg—Ni, Mg—Cu, Ti—Fe, Ti—Mn, Ti—Ni, Ti—V, Mn—Ni, Ti—V—Cr, Ti—V—Fe. Hydrogen absorption capacity, depending on the pressures and temperatures used, varies according to the hydrogen storage materials. Other materials which absorb hydrogen, such as complex chemical hydrides with light elements such as alanates (NaA 1H4), Li- and B-based hydrides such as LiBH4, NaBH4, or even imides or amides, may also be used in the geometry described in the present invention.

In addition, if the two shells have the same longitudinal dimension, the number of different parts to be fabricated is reduced, which reduces costs even more.

Obviously, any other structure of heat exchanger can be used in the two sub-assemblies.

The invention claimed is:

1. A tank for storing hydrogen in the form of hydride, the tank comprising:
    a longitudinal axis (X);
    an assembly plate;
    a liner formed of a first part positioned on a first side of the assembly plate and a second part positioned on a second side of the assembly plate, the second side being longitudinally opposite the first side;
    two heat exchangers, wherein a first of the two heat exchangers is contained in one of the first and second parts and the other of the two heat exchangers is contained in the other of the first and second parts; spaces for hydrogen storage material; and,
    a heat exchanger connector for connecting the heat exchangers to apparatus to supply and evacuate a heat transfer agent;
    a hydrogen exchange connector for connecting to apparatus to supply and collect hydrogen;
    wherein each of the first and second parts have a shell comprising a closed longitudinal first end and a second open longitudinal end, wherein the first part and the second part are joined at their respective second, inwardly facing open longitudinal ends by the assembly plate, the interior volumes of the two parts being configured to be at the same pressure, and,
    wherein the heat exchanger connector is integrated into the assembly plate.

2. A tank according to claim 1, in which the shells each have a barrel and a substantially hemispherical bottom forming the closed first longitudinal end.

3. A tank according to claim 2, in which the heat exchangers have tubes in which a heat exchange fluid can circulate in the two parts of the tank.

4. A tank according to claim 3, in which the assembly plate has at least one distribution cavity for the distribution of the heat transfer agent into which first tubes of the heat exchangers open, and at least one evacuation cavity into which second tubes of the heat exchangers open, each first tube being connected to at least one second tube on the level of the hemispherical part.

5. A tank according to claim 4, in which the assembly plate is composed of two half-plates forming between them the distribution and evacuation cavities.

6. A tank according to claim 5, having braces directed longitudinally between the two half-plates, the above-mentioned braces being substantially in the shape of a bobbin.

7. A tank according to claim 4, in which the assembly plate has at least one radial aperture opening into the distribution cavity and at least one radial aperture opening into the evacuation cavity, the above-mentioned apertures being for connection to apparatus of supply and evacuation of heat transfer agent.

8. A tank according to claim 4, in which first tubes of the two heat exchangers open into the same distribution cavity and second tubes of the two heat exchangers open into the same evacuation cavity.

9. A tank according to claim 4, having connection chambers situated on the level of each of the first closed longitudinal ends of the shells, into which the first and second tubes open.

10. A tank according to claim 9, having braces positioned in at least one of the connection chambers, the above-mentioned braces being directed longitudinally, the above-mentioned braces being substantially in the shape of a bobbin.

11. A tank according to claim 4, in which each first tube and each second tube of each heat exchanger forms a U-tube, the bottom of the U being situated on the level of the first closed longitudinal ends of the shells.

12. A tank according to claim 1, in which the hydrogen exchange connector includes at least one connection tube going through the wall of the barrel or the assembly plate of the first part and at least one connection tube going through the barrel of the second part or the assembly plate.

13. A tank according to claim 12, in which the hydrogen connection tubes form a "crow foot" connection, directly interconnecting hydrogen pressure chambers of the first and second parts.

14. A tank according to claim 1, in which each of the parts includes a flange by which it is fixed to the assembly plate by means of screw and nut sets or by welding.

15. A tank according to claim 1, in which the spaces for the hydrogen storage material are formed by the heat exchangers.

16. A tank according to claim 1 and a hydrogen storage material disposed within the tank.

17. A method of fabricating a tank according to claim 16, including the phases of:
  making the shells of the first and second parts,
  attaching each heat exchanger loaded with the hydrogen storage material to the assembly plate by the ends of heat transfer medium tubes,
  placing the heat exchangers into the shells forming the first and second parts,
  assembling the shells on the assembly plate.

18. A method of fabricating a tank according to claim 17, in which the assembly plate is made from two half-plates, the tubes of each heat exchanger being fixed on one half-plate of the assembly plate, the two half-plates being assembled when the shells are assembled.

19. A method of fabricating a tank according to claim 17, in which the shells include a barrel closed by a substantially hemispherical end, the above-mentioned barrels being equipped with flanges at their open end, assembly of the first and second parts being performed by screw and nut sets going through the flanges and the two half assembly plates or by welding.

20. A tank for storing hydrogen in the form of hydride, the tank comprising:
  a longitudinal axis (X);
  an assembly plate;
  a liner formed of a first part positioned on a first side of the assembly plate and a second part positioned on a second side of the assembly plate, the second side being longitudinally opposite the first side;
  two heat exchangers each contained in one of the first and second parts, wherein the heat exchangers have tubes in which heat exchange fluid can circulate in the two parts of the tank;
  spaces for hydrogen storage material; and,
  heat exchanger connection means for connecting the heat exchangers to means to supply and evacuate a heat transfer agent;
  hydrogen exchange connection means for connecting to means to supply and collect hydrogen;
  wherein each of the first and second parts have a shell comprising a closed longitudinal first end and a second open longitudinal end, wherein the first part and the second part are joined at their respective second inwardly facing open longitudinal ends by means of the assembly plate, the interior volumes of the two parts being configured to be at the same pressure, and wherein the shells each have a barrel and a substantially hemispherical bottom forming the closed first longitudinal end, and wherein the assembly plate has at least one cavity for the distribution of a heat transfer agent into which first tubes of the heat exchangers open, and at least one evacuation cavity into which second tubes of the heat exchanger open, each first tube being connected to at least one second tube on the level of the hemispherical part; and
  wherein the heat exchanger connection means is integrated into the assembly plate.

\* \* \* \* \*